United States Patent [19]
Burton

[11] Patent Number: 6,017,136
[45] Date of Patent: Jan. 25, 2000

[54] ADJUSTING APPARATUS FOR AUTOMOTIVE LAMPS

[76] Inventor: John Burton, 707 W. Court St., Ludington, Mich. 49431

[21] Appl. No.: 08/835,221

[22] Filed: Apr. 7, 1997

[51] Int. Cl.[7] .............................. F21V 21/14; F16B 37/08
[52] U.S. Cl. ......................... 362/273; 362/289; 362/514; 411/182; 411/324; 411/433
[58] Field of Search ..................................... 362/273, 289, 362/428, 514, 515, 524, 528, 529; 411/1, 6, 182, 324, 433, 437

[56] References Cited

U.S. PATENT DOCUMENTS

| | | | |
|---|---|---|---|
| 4,210,033 | 7/1980 | Erikson et al. | 411/324 |
| 4,578,740 | 3/1986 | Krizmanic | 362/273 |
| 4,737,891 | 4/1988 | Burton | 362/61 |
| 4,881,152 | 11/1989 | Watanable et al. | 362/289 |
| 5,214,971 | 6/1993 | Burton et al. | 74/89.13 |
| 5,309,780 | 5/1994 | Schmitt | 74/89.13 |
| 5,453,914 | 9/1995 | Dobler | 362/289 |
| 5,486,985 | 1/1996 | Kemper et al. | 362/69 |
| 5,526,238 | 6/1996 | Van Oel et al. | 362/66 |
| 5,546,283 | 8/1996 | Ohtsuka et al. | 362/61 |
| 5,746,559 | 5/1998 | Shirai | 411/182 |

*Primary Examiner*—Alan Cariaso
*Attorney, Agent, or Firm*—Brian G. Gilpin; Godfrey & Kahn, S.C.

[57] ABSTRACT

An adjusting apparatus for the reflector in an automotive lamp assembly has a screw, a mounting clip for mounting the adjusting apparatus to the reflector, and a retainer clip for positioning the adjusting apparatus such that it can properly adjust the reflector. The adjusting apparatus can be installed as a unitary piece through the lens, or through the support from of the automotive lamp assembly. The adjusting apparatus reduces the labor required to assemble the automotive lamp assembly and the number of parts the assembler must keep in inventory. Thus, the overall cost to produce a completed automotive lamp assembly is reduced.

33 Claims, 5 Drawing Sheets

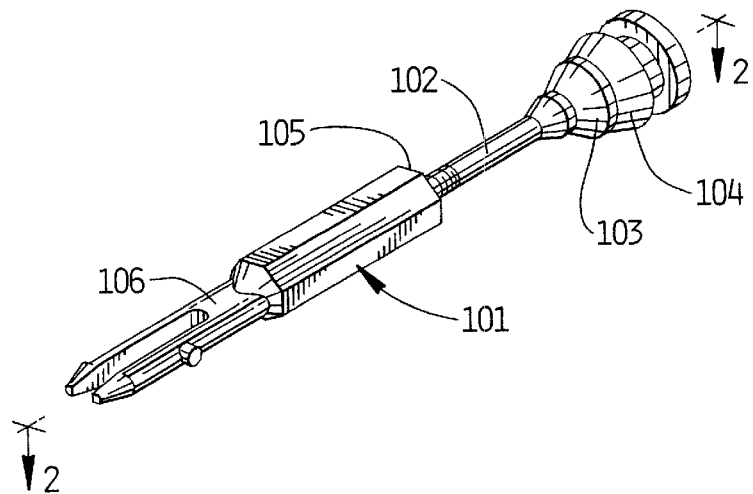
FIG_1
PRIOR ART
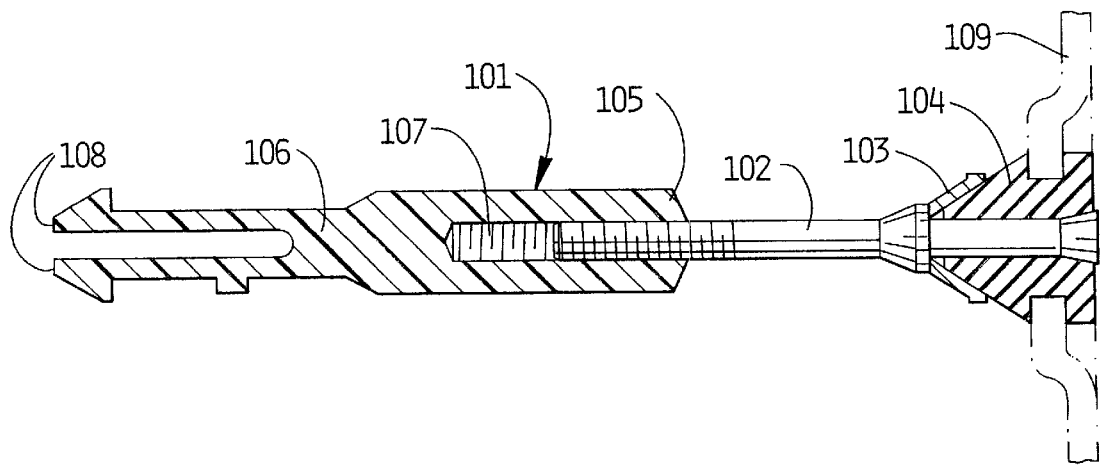
FIG_2
PRIOR ART

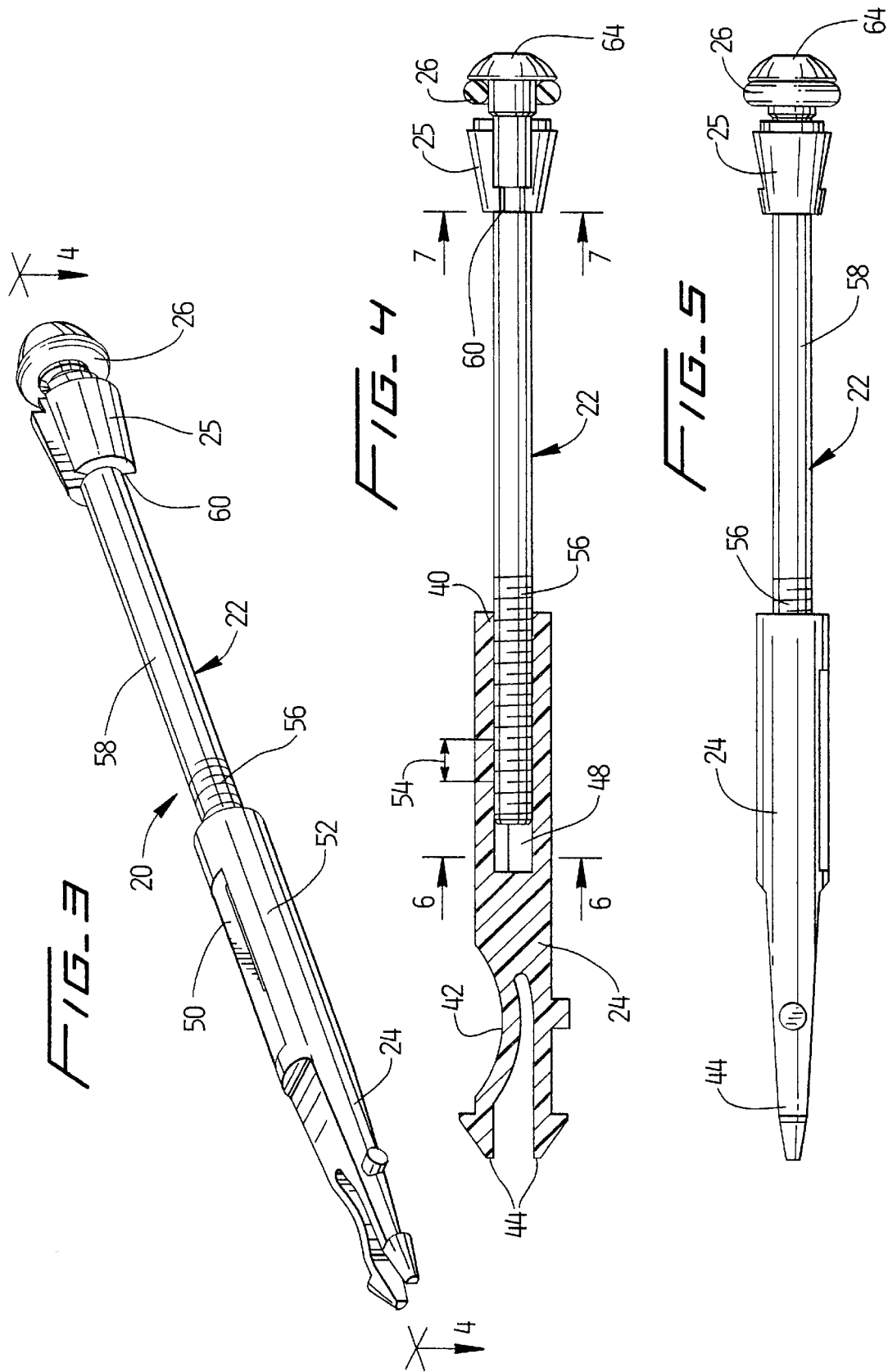

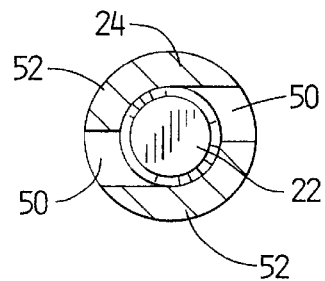
FIG_6
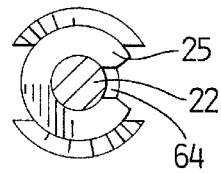
FIG_7
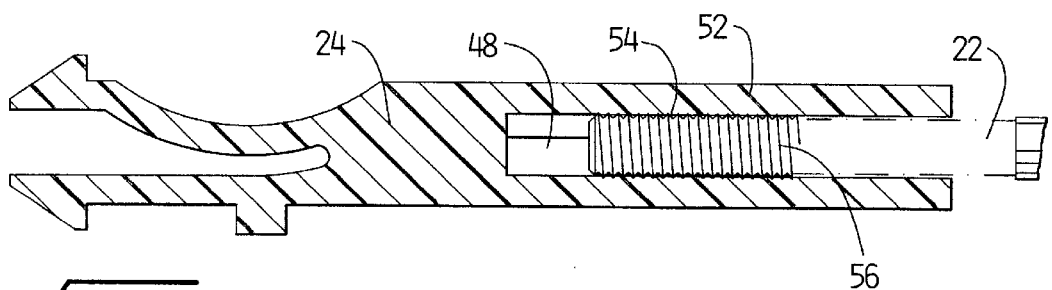
FIG_8A
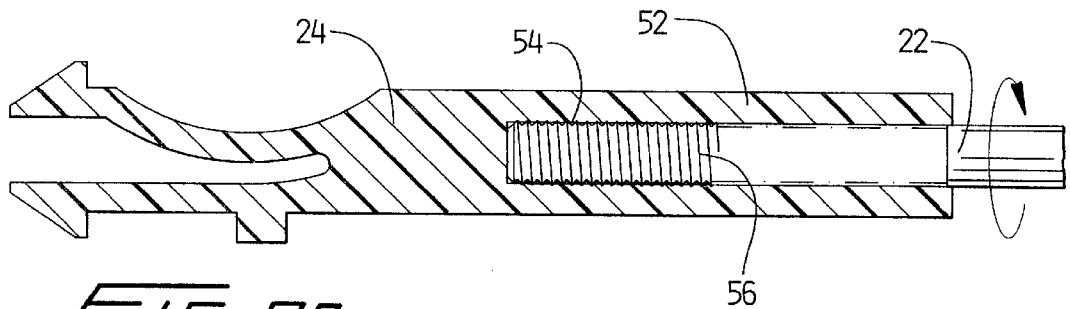
FIG_8B
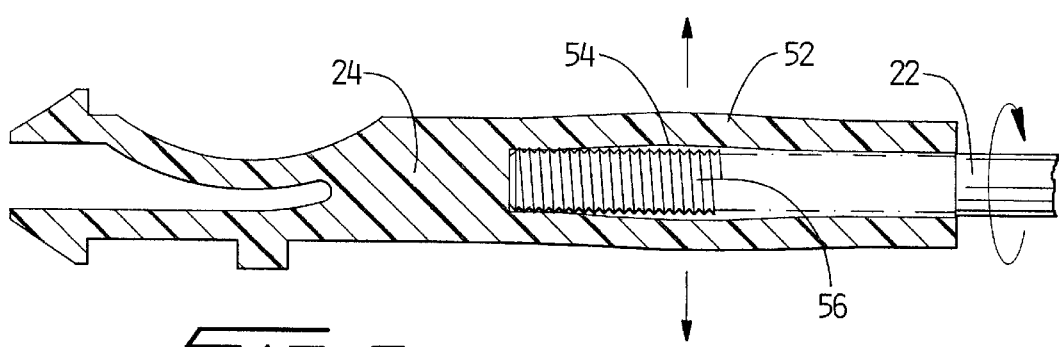
FIG_8C

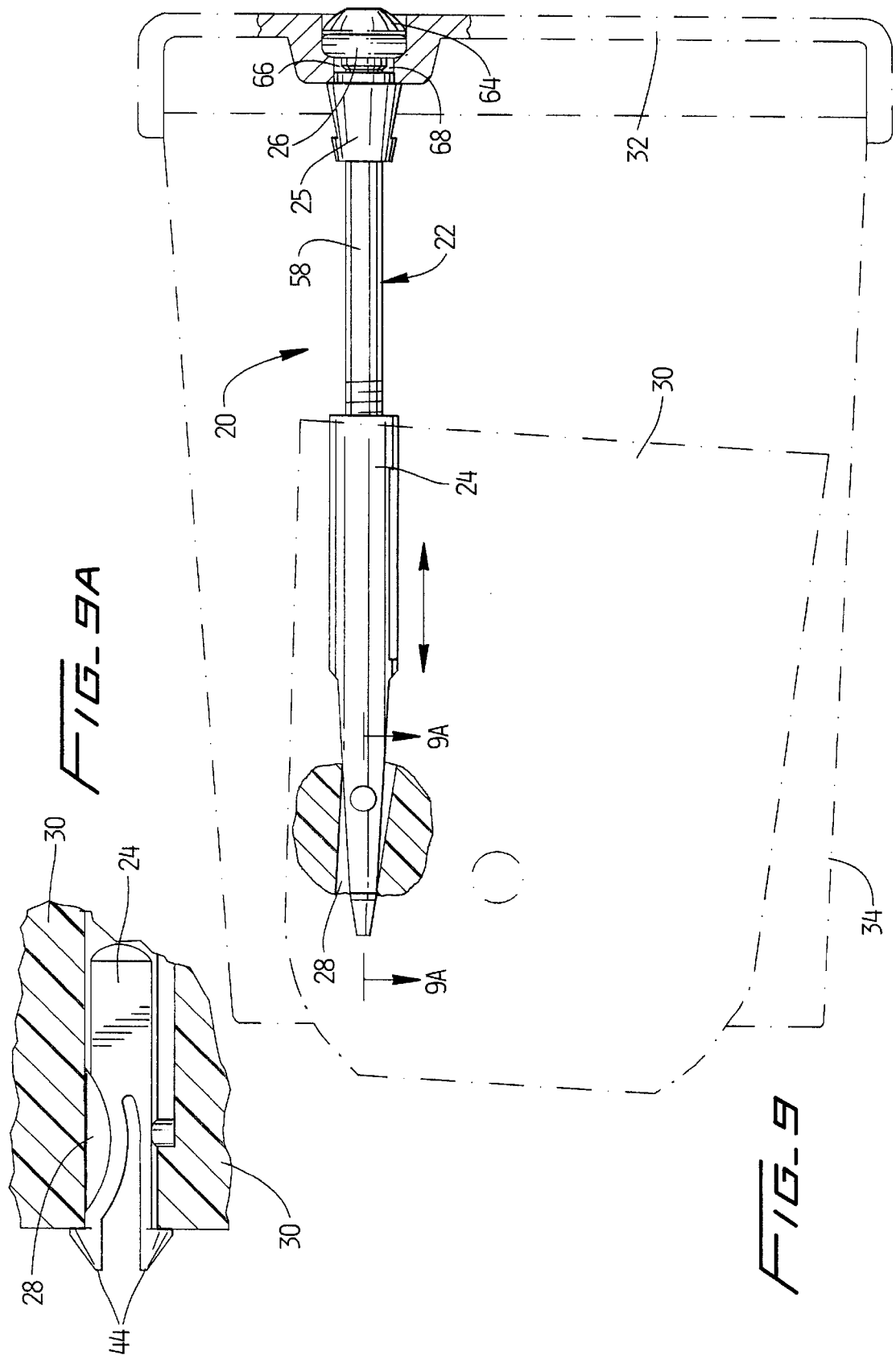

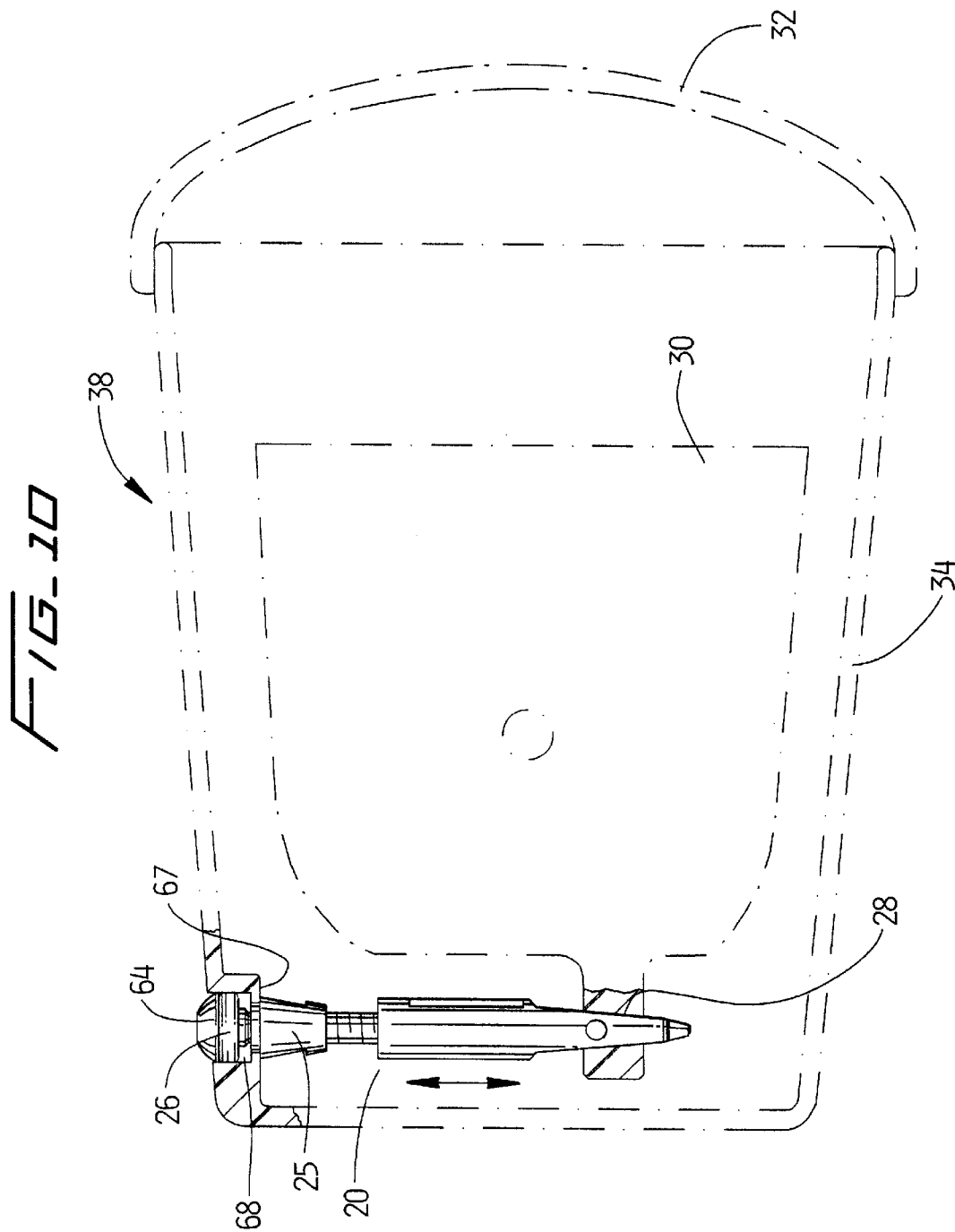

ADJUSTING APPARATUS FOR AUTOMOTIVE LAMPS

BACKGROUND OF THE INVENTION

This invention relates generally to an adjusting apparatus for an automotive lamp assembly, and in particular to an improved adjuster for the reflector inside a lamp assembly.

Automotive lamp assemblies used as headlights or fog lamps typically comprise several basic parts: a support frame, a reflector, a lens, a bulb, and one or more adjusters. The support frame houses the reflector and the bulb on a pivotable mounting to allow the aim of the light to be adjusted using the adjuster. The lens seals the front of the assembly to protect it from the elements assailing the front end of the vehicle and provides an attractive appearance.

In an automotive lamp assembly used as a headlight, the reflector mounts inside the housing on ball-type pivotable mountings and typically adjusts horizontally and vertically using right angle gear adjusters that interface with the reflector. Right angle adjusters are necessary to allow the adjustment of the headlight both vertically and horizontally from adjusting positions above the installed headlight. The headlight cannot be adjusted from behind because of the space constraints of the vehicle's engine compartment. Right angle adjusters, such as the one disclosed in U.S. Pat. No. 5,214,971, and ball-type pivotable mountings are expensive, difficult to install in the headlight assembly, and have a large number of parts.

Because they are positioned on the front of the vehicle beneath the headlights, fog lamps cannot be adjusted from above and must be adjusted from the front. Thus, in automotive lamp assemblies used as fog lamps, the reflector mounts inside the assembly on a vertically pivotable mounting and is adjustable using an adjuster penetrating the front of the assembly trough the lens. The adjuster is inserted in a receiving slot in the reflector and, upon turning a screw that is part of the adjuster, the aim of the light reflected from the reflector is adjusted vertically.

As shown in FIGS. 1 and 2, conventional adjusters for use in the above described type of fog lamp assemblies comprise a mounting clip 101, a screw 102 having a groove, a retaining clip 103, and a gasket 104. Mounting clips 101 for use as part of the adjusters are typically made from plastic or similar material and have a screw-receiving end 105 and a locking end 106. The screw-receiving end 105 has internal threads 107 for receiving the screw 102 and the locking end 106 has a pair of locking arms 108 for locking into a receiving slot in the reflector. Conventionally, the threads in the screw-receiving end 105 are internally molded using an unscrewing mold or the mounting clip is formed from multiple molded parts. The screw 102, typically made from steel, has threads on one end of a shaft and a groove for mounting the retaining clip 103 near a head on the opposite end of the shaft. The gasket 104 is typically made from rubber and mounts over the shaft in the hole in the lens 109. The gasket 104 seals the interface between the shaft of the screw 102 and the hole in the lens 109. The retaining clip mounts to the shaft on the groove and exerts pressure against the inside of the lens to compress the gasket and secure the seal between the shaft of the screw and the hole in the lens.

In assembling the fog lamp assembly to include a conventional adjuster, the assembler first places the rubber gasket in the hole in the lens. Then, the assembler inserts the screw through the hole in the lens and the rubber gasket. Next, the retaining clip is slid over the shaft of the screw and clips in place on the groove, thereby holding the screw to the lens and providing a force to the screw on the inside of the lens such that the hole in the lens is sealed by the gasket and the head of the screw. The mounting clip is then threaded on the shaft of the screw and the lens/adjuster combination is mounted to the support frame placing the mounting clip in a receiving slot in the reflector and sealing the lens to the support frame. The screw in the adjuster can then be turned to properly aim the reflector in the fog lamp assembly.

Typically, adjusters are supplied by a subcontractor to the company producing the completed fog lamp assemblies. Because of the multiple steps necessary to assemble the fog lamp assemblies using conventional adjusters, the adjusters are supplied to the fog lamp assembler in their component parts and the fog lamp assembler installs the parts as the fog lamp assembly is put together. Once assembly is completed, the fog lamp assembly is shipped to the automobile manufacturer for installation.

There are several drawbacks to using conventional adjusters in fog lamp assemblies. First, the installation of conventional adjusters requires multiple steps at the time of installation in the fog lamp assembly. Second, conventional adjusters can cause damage to the reflector or can themselves fail if the adjusting screw is over-tightened. Third, the use of conventional adjusters requires the installer to separately stock the multiple parts required to complete the assembly and installation of the adjuster. Finally, using unscrewing molds or multiple molded parts to introduce the threads into the screw-receiving end of the mounting clip is quite expensive and complicated to manufacture.

Accordingly, a need exists for a lamp adjuster that is easily assembled, is provided to the final lamp assembly facility as a unitary piece, provides a sufficient seal with the lens in a fog lamp (the support frame in a headlight) to protect the assembly, cannot be over-tightened, and is cost-effective. The present invention relates to an improved adjusting apparatus for automotive lamps and to solutions to some of the problems raised or not solved by existing adjusters.

SUMMARY OF THE INVENTION

It is therefore an object of the present invention to provide a lamp adjuster that can be coupled to a lamp assembly in one installation step.

It is another object of the present invention to provide a lamp adjuster for fog lamps that can be inserted into a hole in the lens and coupled to the reflector after the lens has been attached to the fog lamp assembly.

It is a further object of the present invention to provide a lamp adjuster having a torque limiting mechanism to prevent over-tightening of the screw.

It is still another object of the present invention to provide a lamp adjuster that can be installed in the lamp assembly as a unitary piece.

It is an additional object of the present invention to provide a lamp adjuster for fog lamps that provides a good seal with the lens and is cost-effective. Likewise, it is an additional object of the present invention to provide a lamp adjuster for headlights that provides a good seal with the support frame and is cost-effective.

The lamp adjuster of the present invention provides the above identified and many additional objects by providing a lamp adjuster that can be shipped to the lamp assembler as a unitary part, provides a good seal with the lens, is easily installed, has a torque limiting mechanism, and is cost-effective.

The lamp adjuster of the present invention, as with the conventional adjuster, comprises a screw, a mounting clip, a retaining clip, and a gasket. However, the construction of the individual pieces, coupled with a different method of installation, provides significant advantages over conventional adjusters. The use of the adjuster of the present invention as a headlight adjuster or a fog lamp adjuster can save the assembler significant amounts of time and money by reducing the number of parts that have to be stocked and reducing the amount of labor necessary to install the adjuster in a lamp assembly.

The mounting clip in accordance with the present invention has a screw-receiving end and a locking end. The locking end has a pair of locking arms for locking the mounting clip into a receiving slot in the reflector. The screw-receiving end has a slotted shaft for receiving the screw. The slotted shaft is formed by two threaded members, each threaded for a portion of their length, and open slots between the threaded members. The threads in the threaded members are formed by placing a quarter of a thread on both sides of the molding tool that forms the slots. The slotted shaft acts as a torque-limiter by flexing outwardly and causing the internal threads in the mounting clip to disengage the threads of the screw if too much torque is applied to the screw. Thus, the problem of damage or failed parts due to over-tightening of the adjusting screw is eliminated.

The screw used in an adjuster in accordance with the present invention has threads on one end of a shaft and a groove for mounting the retaining clip near a head on the opposite end of the shaft. The groove is machined or roll formed into the screw such that the retaining clip is positioned on the groove to retain the screw in the lens (in a fog lamp installation) or the support frame (in a headlight installation) and to seat the gasket to create a radial seal between the shaft of the screw and the hole. The gasket is placed over the shaft of the screw between the retaining clip and the head of the screw such that the gasket becomes mounted in the hole and forms a radial seal upon installation of the adjuster.

The lamp adjuster in accordance with the present invention is supplied to the lamp assembler as a unitary piece. In assembling this unitary piece, the gasket is first placed over the shaft of the screw and slid along the length to the head. Next, the retaining clip is snapped into place on the groove of the shaft. Finally, the mounting clip is threaded onto the threads of the screw a predetermined distance. The predetermined distance varies depending on the dimensions of the reflector and the overall dimensions of the support frame and can be predetermined by the lamp assembler. The unitary piece lamp adjuster is then ready for shipment to the lamp assembler.

Installing the adjuster of the present invention in a fog lamp assembly requires one step inserting the adjuster through a hole in the lens such that the mounting clip and retainer clip simultaneously snap into the receiving slot in the reflector and inside of the lens respectively. The adjuster can be installed after the lens has been sealed to the support frame of the fog lamp assembly and can be installed after construction of the assembly is completed. Likewise, installing the adjuster of the present invention in a headlight assembly requires one step—inserting the adjuster through a hole in the support frame such that the mounting clip and retainer clip simultaneously snap into a receiving slot in the reflector and inside of the support fire respectively. The one-step installation procedure significantly reduces the amount of time necessary to install the adjuster and the unitary design allows the assembler to stock one part rather than the four parts of a conventional adjuster.

These and other objects and advantages of the present invention will become apparent from the detailed description, claims, and accompanying drawings.

DESCRIPTION OF THE DRAWING

FIG. 1 is a perspective view of a conventional fog lamp adjuster;

FIG. 2 is a cross-section of the conventional fog lamp adjuster in FIG. 1 taken generally along the line 2—2;

FIG. 3 is a perspective view of an adjuster in accordance with the present invention;

FIG. 4 is a cross-section of the adjuster in FIG. 3 taken generally along the line 4—4;

FIG. 5 is a top plan view of an adjuster in accordance with the present invention;

FIG. 6 is a cross-section of the adjuster in FIG. 4 taken generally along the line 6—6;

FIG. 7 is a cross-section of the adjuster in FIG. 4 taken generally along the line 7—7;

FIG. 8 is a detailed cross-section of the mounting clip and screw of the adjuster in FIG. 3 taken generally along the line 4—4;

FIG. 8A is a detailed cross-section of the mounting clip and screw of the adjuster in FIG. 3 taken generally along the line 4—4; the screw having been rotated from its position in FIG. 8 with the internal and external threads interacting to cause the mounting clip and the screw to change positions relative to each other;

FIG. 8B is a detailed cross-section of the mounting clip and screw of the adjuster in FIG. 3 taken generally along the line 4—4; the screw having been further rotated from its position in FIG. 8A with the threaded members flexing outwardly (shown by the arrows) to cause the external threads of the screw to slip in the internal threads of the threaded members.

FIG. 9 is a side elevational view of an adjuster in accordance with the present invention installed in a fog lamp assembly, the reflector and lens are shown partially in phantom and partially in cross-section, and the support frame is shown in phantom;

FIG. 9A is a cross-section of the mounting clip snappingly engaged in the reflector in FIG. 9 taken generally along the line 9A—9A; and FIG. 10 is a side elevational view of an adjuster in accordance with the present invention installed in a headlight assembly, the reflector and support frame are shown partially in phantom and partially in cross-section, and the lens is shown in phantom.

DETAILED DESCRIPTION OF THE PREFERRED EMBODIMENTS

FIG. 3 is a perspective view of an adjuster 20 in accordance with the present invention. As described in more detail below, the adjuster 20 comprises a screw 22, a mounting clip 24, a retainer clip 25, and a gasket 26. When assembled, the adjuster 20 mounts in a receiving slot 28 in a reflector 30 and sealingly passes through a lens 32 in a fog lamp installation, FIG. 9, or through a support frame 34 in a headlight installation, FIG. 10. The reflector 30 and lens 32, along with the support frame 34, the adjuster 20, and a bulb (mounted inside the reflector and not shown), form a lamp assembly 38.

As shown in cross-section in FIG. 4, the mounting clip 24 in accordance with the present invention has a screw-receiving end 40 and a locking end 42. The screw-receiving end 40 engages the screw 22 and the locking end 42 engages the reflector 30 to adjust the aim of the light being emitted from the lamp assembly.

A pair of locking arms 44 form the locking end 42 of the mounting clip 24 and snap fit into a receiving slot 46 formed in the reflector 30. The length of the locking arms 44 and the stiffness of the material forming the mounting clip 24 determines the tightness of the snap fit. If shorter locking arms 44 are molded or a stiffer material is used, the snap fit will be tighter. If longer locking arms 44 are molded or a more flexible material is used, the snap fit will be looser. In the preferred embodiment, the mounting clip 24 is molded from glass filled nylon using an injection molding process, but other materials capable of performing the required functions of the mounting clip 24 and other forming processes may be used.

The screw-receiving end 40 of the mounting clip 24 has a slotted shaft 48 for receiving the screw 22. Slotted shaft 48 is formed by slots 50 and threaded members 52 and acts as a torque limiter in the event that too much torque is placed on the screw 22. For engaging screw 22, threaded members 52 have internal threads 54 formed in slotted shaft 48. As shown in FIGS. 8, 8A, and 8B, before screw 22 can be torqued sufficiently that other parts of the fog lamp assembly 38 are in danger of breaking or stressing, the threaded members 52 of the slotted shaft 48 flex away (arrows in FIG. 8B) from the center of the slotted shaft 48 because of excessive force being exerted on the internal threads 54 by the external threads 56 of screw 22. This allows the external threads 56 of screw 22 to slip the internal threads 54 in the threaded members 52. Thus, the adjuster 22 in accordance with the present invention reduces the problem of cracked parts due to over-tightening of the screw 22. The internal threads 54 on threaded members 52 are formed by a molding tool having threads—the same molding tool that is used to form the slots 50. The use of such a molding tool to mold the threads eliminates the need for expensive unscrewing molds or a multiple piece mounting clip 24.

The screw 22 in accordance with the present invention has external threads 56 on one end of a shaft 58 and a groove 60 for mounting a retainer clip 25 near a head 64 on the opposite end of the shaft 58. The groove 60 is machined or roll formed into the screw 22 such that the retainer clip 25 can be positioned around the groove 60 to retain the screw 22 in the lens 32 in a fog lamp installation (or in the support frame 34 in a head lamp installation) and to seat the gasket 26 to create a radial seal between the shaft 58 of the screw 22 and the hole 68 through which the adjuster 20 is inserted.

As best seen in FIG. 3, retainer clip 25 is molded from nylon in a frusto-conical shape with a longitudinal section removed to allow the narrow end of the retainer clip 25 to snap on to the groove 60 of the screw 22. Other materials having properties and characteristics similar to nylon may be used to mold the retainer clip 25. The circumference of the wide end of retainer clip 25 flexes radially inward as the retainer clip 25 passes through the hole 68 during installation and snaps out after clearing the inside 66 of the lens 32 or support frame 34. The wide end of the retainer clip 25 engages the inside 66 of the lens 32 or inside 67 of the support frame 34 to compress the gasket 26 and seal the hole 68. The gasket 26, which may be in the form of an O-ring, is placed over the shaft 58 of the screw 22 between the retainer clip 25 and the head 64 such that the gasket 26 becomes mounted in the hole 68 upon installation of the adjuster 20.

The adjuster 20 in accordance with the present invention may be supplied to the installer as a unitary, pre-assembled piece in order to reduce the number of parts that the installer must keep in inventory. In assembling the adjuster 20, the gasket 26 slides over the length of the shaft 58 of the screw 22 and abuts the head 64. Next, the narrow end of the retainer clip 25 is snapped into place on the groove 60 of the shaft 58. Finally, the internal threads 54 of the mounting clip 24 are threaded onto the external threads 56 of the screw 22, the mounting clip 24 thereby being mounted onto the shaft 58 of the screw 22. The assembled adjuster 20 may then be shipped to the installer. If desired, the mounting clip 24 can be screwed onto the screw 22 a predetermined length before shipment to the installer. The predetermined length varies depending upon the dimensions of the particular lamp assembly 38 in which the adjuster 20 will be used such that the mounting clip 24 will properly engage the receiving slot 28 when the adjuster 20 is installed. Setting a predetermined length for screwing the mounting clip 24 on to the screw 22 allows the installer to receive adjusters 22 that are ready for immediate installation into lamp assemblies without adjustment.

Installing an adjuster 20 in accordance with the present invention in a fog lamp assembly 38 (FIG. 9) is a simple process. After the length of the adjuster 20 has been adjusted such that the mounting clip 24 will properly engage the receiving slot 28, the assembled adjuster 20 is inserted through the hole 68 in the lens 32 such that the mounting clip 24 snappingly engages the receiving slot 28 in the reflector 30. As the mounting clip 24 engages the receiving slot 28, the retainer clip 25 snaps into place on the inside 66 of the lens 32 such that gasket 26 is compressed to seal the connection between the hole 68 and the shaft 58 of the screw 22. The screw 22 can then be rotated to cause adjustment of the reflector 30. Unlike conventional adjusters, the adjuster 20 in accordance with the present invention can be installed even after the lens 32 has been sealed to the support frame 34 of the fog lamp assembly 38. The simple installation of the adjuster 20 and the elimination of the need to stock multiple parts results in significant cost savings to the installer.

Similarly, installing an adjuster 20 in accordance with the present invention in a headlight assembly 38 (FIG. 10) is a simple process. The assembled adjuster 20 is inserted through the hole 68 in the support frame 34 such that the mounting clip 24 snappingly engages the receiving slot 28 in the reflector 30. As the mounting clip 24 engages the receiving slot 28, the retainer clip 25 snaps into place on the inside 66 of the support frame 34 such that gasket 26 is compressed to seal the connection of the hole 68 and the shaft 58 of the screw 22. The screw 22 can then be rotated to cause adjustment of the reflector 30. As with the installation in a fog lamp assembly, the simple installation of the adjuster 20 in the headlight assembly and the elimination of the need to stock multiple parts results in significant cost savings to the installer.

As illustrated by the foregoing description and shown in the Figures, the present invention is more suitable as a lamp adjuster than are existing lamp adjusters. The present invention overcomes the limitations and disadvantages of existing lamp adjusters by utilizing an effective design that limits the amount of torque that can be placed on the adjusting screw, can be provided to the assembler as a unitary part, can be easily installed in one step, and is cost-effective.

Although the invention has been herein shown and described in what is perceived to be the most practical and preferred embodiment, it is to be understood that the invention is not intended to be limited to the specific embodiments set forth above. Rather, it is recognized that modifications may be made by one of skill in the art of the invention without departing from the spirit or intent of the invention and therefore, the invention is to be taken as including all reasonable equivalents to the subject matter of the appended claims.

I claim:

1. An adjusting apparatus for a lamp assembly having a support frame, a lens covering a front of said support frame, and a reflector adjustably mounted within said support frame; said adjusting apparatus comprising:
   a screw having a shaft and a head, said shaft having a threaded portion and a groove;
   a mounting clip engageable with said reflector and having a torque-limiter threaded to said threaded portion of said shaft; and
   a retainer clip mounted on said groove of said shaft such that when said mounting clip is engaged with said reflector, a rotation of said screw causes said adjusting apparatus to adjust said reflector.

2. An adjusting apparatus for a lamp assembly having a support frame, a lens covering a front of said support frame, and a reflector adjustably mounted within said support frame, said adjusting apparatus comprising:
   a screw having a shaft and a head, said shaft having a threaded portion and a groove;
   a mounting clip engageable with said reflector and having a torque-limiter threaded to said threaded portion of said shaft;
   a retainer clip mounted on said groove of said shaft such that when said mounting clip is engaged with said reflector, a rotation of said screw causes said adjusting apparatus to adjust said reflector; and
   wherein said adjusting apparatus is installed as a unitary piece in said lamp assembly through a hole in said lens such that when said mounting clip is engaged with said reflector, said retainer clip engages said lens.

3. The adjusting apparatus of claim 2 wherein said torque-limiter comprises a slotted shaft; said slotted shaft having internally molded threads for engaging said threaded portion of said shaft.

4. The adjusting apparatus of claim 3 wherein said slotted shaft comprises a plurality of threaded members parallel to a plurality of slots; said plurality of threaded members capable of flexing outwardly from a centerline of said slotted shaft due to a force greater than a predetermined amount exerted on said internally molded threads by said screw.

5. The adjusting apparatus of claim 2 wherein said retainer clip engages an inside surface of said lens such that a gasket on said shaft proximal to said head is positioned to sealingly engage said hole in said lens.

6. The adjusting apparatus of claim 4 wherein said mounting clip snappingly engages a receiving slot in said reflector using a pair of locking arms.

7. An adjusting apparatus for a lamp assembly having a support frame, a lens covering a front of said support frame, and a reflector adjustably mounted within said support frame; said adjusting apparatus comprising:
   a screw having a shaft and a head, said shaft having a threaded portion and a groove;
   a mounting clip engageable with said reflector and having a torque-limiter threaded to said threaded portion of said shaft;
   a retainer clip mounted on said groove of said shaft such that when said mounting clip is engaged with said reflector, a rotation of said screw causes said adjusting apparatus to adjust said reflector; and
   wherein said adjusting apparatus is installed as a unitary piece in said lamp assembly through a hole in said support frame.

8. The adjusting apparatus of claim 7 wherein said torque-limiter comprises a slotted shaft; said slotted shaft having internally molded threads for engaging said threaded portion of said shaft.

9. The adjusting apparatus of claim 8 wherein said slotted shaft comprises a plurality of threaded members parallel to a plurality of slots; said plurality of threaded members capable of flexing outwardly from a centerline of said slotted shaft due to a force greater than a predetermined amount exerted on said internally molded threads by said screw.

10. The adjusting apparatus of claim 7 wherein said retainer clip engages an inside surface of said support frame such that a gasket on said shaft proximal to said head is positioned to sealingly engage said hole in said support frame.

11. The adjusting apparatus of claim 9 wherein said mounting clip snappingly engages a receiving slot in said reflector using a pair of locking arms.

12. A lamp assembly comprising:
   a support frame having a forward side;
   a reflector adjustably mounted within said support frame;
   a lens covering said forward side of said support frame;
   an adjuster engaging said reflector such that said adjuster is capable of adjusting said reflector; said adjuster comprising a screw, a mounting clip, and a retainer clip;
   said screw having a shaft and a head;
   said mounting clip having a torque-limiter threaded to a threaded portion of said shaft; said mounting clip engaging said reflector; and
   said retainer clip mounted on a groove of said shaft; said retainer clip positioning said adjuster within said lamp assembly such that a rotation of said screw causes said adjuster to adjust said reflector.

13. A lamp assemble comprising:
   a support frame having a forward side;
   a reflector adjustably mounted within said support frame;
   a lens covering said forward side of said support frame;
   an adjuster engaging said reflector such that said adjuster is capable of adjusting said reflector; said adjuster comprising a screw, a mounting clip, and a retainer clip;
   said screw having a shaft and a head;
   said mounting clip having a torque-limiter threaded to a threaded portion of said shaft;
   said mounting clip engaging said reflector;
   said retainer clip mounted on a groove of said shaft; said retainer clip positioning said adjuster within said lamp assembly such that a rotation of said screw causes said adjuster to adjust said reflector; and
   wherein said adjuster is installed as a unitary piece through a hole in said lens.

14. The lamp assembly of claim 13 wherein said torque-limiter comprises a slotted shaft; said slotted shaft having internally molded threads for engaging said threaded portion of said shaft.

15. The lamp assembly of claim 14 wherein said slotted shaft comprises a plurality of threaded members parallel to a plurality of slots; said plurality of threaded members capable of flexing outwardly from a centerline of said slotted shaft due to a force greater than a predetermined amount exerted on said internally molded threads by said screw.

16. The lamp assembly of claim 13 wherein said retainer clip engages an inside surface of said lens such that a gasket on said shaft proximal to said head is positioned to sealingly engage said hole in said lens.

17. The lamp assembly of claim 15 wherein said mounting clip snappingly engages a receiving slot in said reflector using a pair of locking arms.

18. A lamp assembly comprising:
a support frame having a forward side;
a reflector adjustably mounted within said support frame;
a lens covering said forward side of said support frame;
an adjuster engaging said reflector such that said adjuster is capable of adjusting said reflector; said adjuster comprising a screw a mounting clip, and a retainer clip;
said screw having a shaft and a head; said mounting clip having a torque-limiter threaded to a threaded portion of said shaft;
said mounting clip engaging said reflector;
said retainer clip mounted on a groove of said shaft; said retainer clip positioning said adjuster within said lamp assembly such that a rotation of said screw causes said adjuster to adjust said reflector; and
wherein said adjuster is installed as a unitary piece through a hole in said support frame.

19. The lamp assembly of claim 18 wherein said torque-limiter comprises a slotted shaft; said slotted shaft having internally molded threads for engaging said threaded portion of said shaft.

20. The lamp assembly of claim 19 wherein said slotted shaft comprises a plurality of threaded members parallel to a plurality of slots; said plurality of threaded members capable of flexing outwardly from a centerline of said slotted shaft due to a force greater than a predetermined amount exerted on said internally molded threads by said screw.

21. The lamp assembly of claim 18 wherein said retainer clip engages an inside surface of said support frame such that a gasket on said shaft proximal to said head is positioned to sealingly engage said hole in said support frame.

22. The lamp assembly of claim 20 wherein said mounting clip snappingly engages a receiving slot in said reflector using a pair of locking arms.

23. A method of installing an adjuster in a lamp assembly; said adjuster having a screw, a mounting clip having a torque-limiter threaded to a threaded portion of said screw, and a retainer clip mounted to said screw; said method comprising:
inserting said adjuster through a hole in a wall of said lamp assembly;
disposing said mounting clip to engage a reflector adjustably mounted within said lamp assembly; and
situating said retainer clip in relation to an inside surface of said wall such that a gasket on said screw sealingly engages said hole in said wall.

24. The method of installing an adjuster in a lamp assembly of claim 23 further comprising:
first, sealing a lens to a support frame in which said reflector adjustably mounts; said lens and said support frame forming a plurality of walls of said automotive lamp assembly.

25. The method of installing an adjuster in an automotive lamp assembly of claim 24 wherein:
said step of inserting said adjuster comprises inserting said adjuster through a hole in said lens; and
said step of disposing said mounting clip comprises snappingly engaging a pair of locking arms of said mounting clip in a receiving slot in said reflector.

26. The method of installing an adjuster in an automotive lamp assembly of claim 24 wherein:

said step of inserting said adjuster comprises inserting said adjuster through a hole in said support frame; and
said step of disposing said mounting clip comprises snappingly engaging a pair of locking arms of said mounting clip in a receiving slot in said reflector.

27. An adjuster for a lamp assembly having a reflector comprising:
an adjusting screw capable of adjusting said reflector when a torque is provided to said adjusting screw; and
a torque limiting means coupling said adjusting screw to said reflector; said torque limiting means capable of limiting said torque to an amount not capable of damaging said reflector; said torque limiting means capable of limiting said torque to an amount not capable of damaging said adjuster.

28. An adjuster for a lamp assembly having a reflector comprising:
an adjusting screw capable of adjusting said reflector when a torque is provided to said adjusting screw;
a torque limiting means coupling said adjusting screw to said reflector; said torque limiting means capable of limiting said torque to an amount not capable of damaging said reflector; said torque limiting means capable of limiting said torque to an amount not capable of damaging said adjuster; and
wherein said torque limiting means comprises a slotted shaft; said slotted shaft having at least one threaded member; said at least one threaded member having internal threads engaging exterior threads on said adjusting screw such that said at least one threaded member is capable of flexing outwardly away from said adjusting screw due to a force greater than a predetermined amount exerted on said internal threads by the exterior threads of said adjusting screw.

29. An adjusting apparatus for a lamp assembly having a support frame, a lens covering a front of said support frame, and a reflector adjustably mounted within said support frame; said adjusting apparatus comprising:
a screw having a shaft and a head, said shaft having a threaded portion and a groove;
a mounting clip threaded to said threaded portion of said shaft; said mounting clip engaging said reflector, said mounting clip including a torque-limiter; and
a retainer clip mounted on said groove of said shaft; said retainer clip positioning said adjusting apparatus within said lamp assembly such that when said mounting clip is engaged with said reflector, a rotation of said screw causes said adjusting apparatus to adjust said reflector.

30. An adjusting apparatus for a lamp assembly having a support frame, a lens covering a front of said support frame, and a reflector adjustably mounted within said support frame; said adjusting apparatus comprising:
a screw having a shaft and a head, said shaft having a threaded portion and a groove;
a mounting clip threaded to said threaded portion of said shaft; said mounting clip engaging said reflector;
a retainer clip mounted on said groove of said shaft; said retainer clip positioning said adjusting apparatus within said lamp assembly such that when said mounting clip is engaged with said reflector, a rotation of said screw causes said adjusting apparatus to adjust said reflector; and
wherein said adjusting apparatus is capable of being installed in said lamp assembly after said adjusting apparatus has been fully assembled.

31. A headlamp adjuster for adjusting the reflector within a headlamp assembly, the adjuster comprising:

an adjustment screw including a threaded shaft portion; and a mounting clip engageable in the reflector, the mounting clip including a torque-limiter threaded to the threaded shaft portion of the adjustment screw.

32. The headlamp adjuster of claim 31 wherein the torque-limiter is a slotted shaft formed by slots and threaded members, the threaded members threaded to the threaded shaft portion of the adjustment screw.

33. The headlamp adjuster of claim 32 wherein when an excess torque is imparted on the adjustment screw, the threaded members flex away from the adjustment screw to allow the threaded members to disengage from the threaded shaft portion of the adjustment screw.

* * * * *